United States Patent
Ballard

(10) Patent No.: US 8,958,282 B2
(45) Date of Patent: Feb. 17, 2015

(54) 1-FOR-N REDUNDANCY IN PRIVATE IP SESSION BORDER CONTROL NETWORKS

(75) Inventor: Stephen Ballard, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 928 days.

(21) Appl. No.: 12/634,977

(22) Filed: Dec. 10, 2009

(65) Prior Publication Data

US 2011/0141879 A1   Jun. 16, 2011

(51) Int. Cl.
*H04L 12/26* (2006.01)
*H04L 12/24* (2006.01)
*H04L 12/707* (2013.01)
*H04L 12/703* (2013.01)

(52) U.S. Cl.
CPC ............ *H04L 41/06* (2013.01); *H04L 41/0843* (2013.01); *H04L 41/0846* (2013.01); *H04L 45/22* (2013.01); *H04L 45/28* (2013.01)
USPC ........................................................ 370/217

(58) Field of Classification Search
USPC ......... 370/216–221, 229–231, 235, 241–244, 370/246, 351, 389, 392, 398, 395.31, 400, 370/401
See application file for complete search history.

(56) References Cited

U.S. PATENT DOCUMENTS

| | | | | |
|---|---|---|---|---|
| 7,038,574 | B1 * | 5/2006 | Schlesener et al. | 340/286.02 |
| 7,188,189 | B2 * | 3/2007 | Karol et al. | 709/238 |
| 7,408,928 | B2 * | 8/2008 | Bradd et al. | 370/389 |
| 7,587,633 | B2 * | 9/2009 | Talaugon et al. | 714/21 |
| 7,817,541 | B2 * | 10/2010 | Gray et al. | 370/220 |
| 7,944,817 | B1 * | 5/2011 | Sylvain | 370/228 |
| 7,961,720 | B2 * | 6/2011 | Terpstra et al. | 370/352 |
| 8,174,965 | B2 * | 5/2012 | Boucadair et al. | 370/218 |
| 2003/0147403 | A1 * | 8/2003 | Border et al. | 370/395.53 |
| 2004/0205149 | A1 * | 10/2004 | Dillon et al. | 709/217 |
| 2006/0262916 | A1 * | 11/2006 | Marascio et al. | 379/201.01 |
| 2007/0183404 | A1 * | 8/2007 | Hofer | 370/352 |
| 2008/0137671 | A1 * | 6/2008 | Agarwal et al. | 370/401 |
| 2008/0144605 | A1 * | 6/2008 | Qiu et al. | 370/352 |
| 2008/0165801 | A1 * | 7/2008 | Sheppard | 370/465 |
| 2008/0317011 | A1 * | 12/2008 | Datta et al. | 370/356 |
| 2009/0086742 | A1 * | 4/2009 | Ghai et al. | 370/401 |
| 2009/0196183 | A1 * | 8/2009 | Kakadia et al. | 370/237 |
| 2010/0332915 | A1 * | 12/2010 | Qiu et al. | 714/49 |

FOREIGN PATENT DOCUMENTS

WO   WO 2008107597 A2 *   9/2008

* cited by examiner

*Primary Examiner* — Curtis A Alia

(57) ABSTRACT

One or more devices in a provider network receive a notification that a border controller (SBC) device has failed and, in response to the notification, modify a backup SBC configuration file for the failed SBC device to create a modified backup configuration file, where the modified backup configuration file replaces carrier-side Internet Protocol (IP) addresses of the failed SBC device with carrier-side addresses of a failover SBC device. The devices send the modified backup configuration file to the failover SBC device to configure the failover SBC device and send a backup router configuration file for a local router associated with the failed SBC device to a local router associated with the failover SBC device, where the backup router configuration file is to configure the local router associated with the failover SBC. The devices also provide, to a domain name system (DNS) server, carrier-side IP addresses for the failover SBC device to replace IP addresses associated with fully-qualified domain names (FQDNs) of the failed SBC device.

20 Claims, 7 Drawing Sheets

1-FOR-N REDUNDANCY IN PRIVATE IP SESSION BORDER CONTROL NETWORKS

BACKGROUND INFORMATION

In some voice-over-Internet-Protocol (VoIP) networks, a session border controller (SBC) may be employed for managing signaling and/or media streams. Currently, a mechanism for providing full failover capability for customers of these VoIP networks is not cost-effective, since an entire new redundant SBC node would have to be provided for each SBC site (i.e., a 1-for-1 redundancy).

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
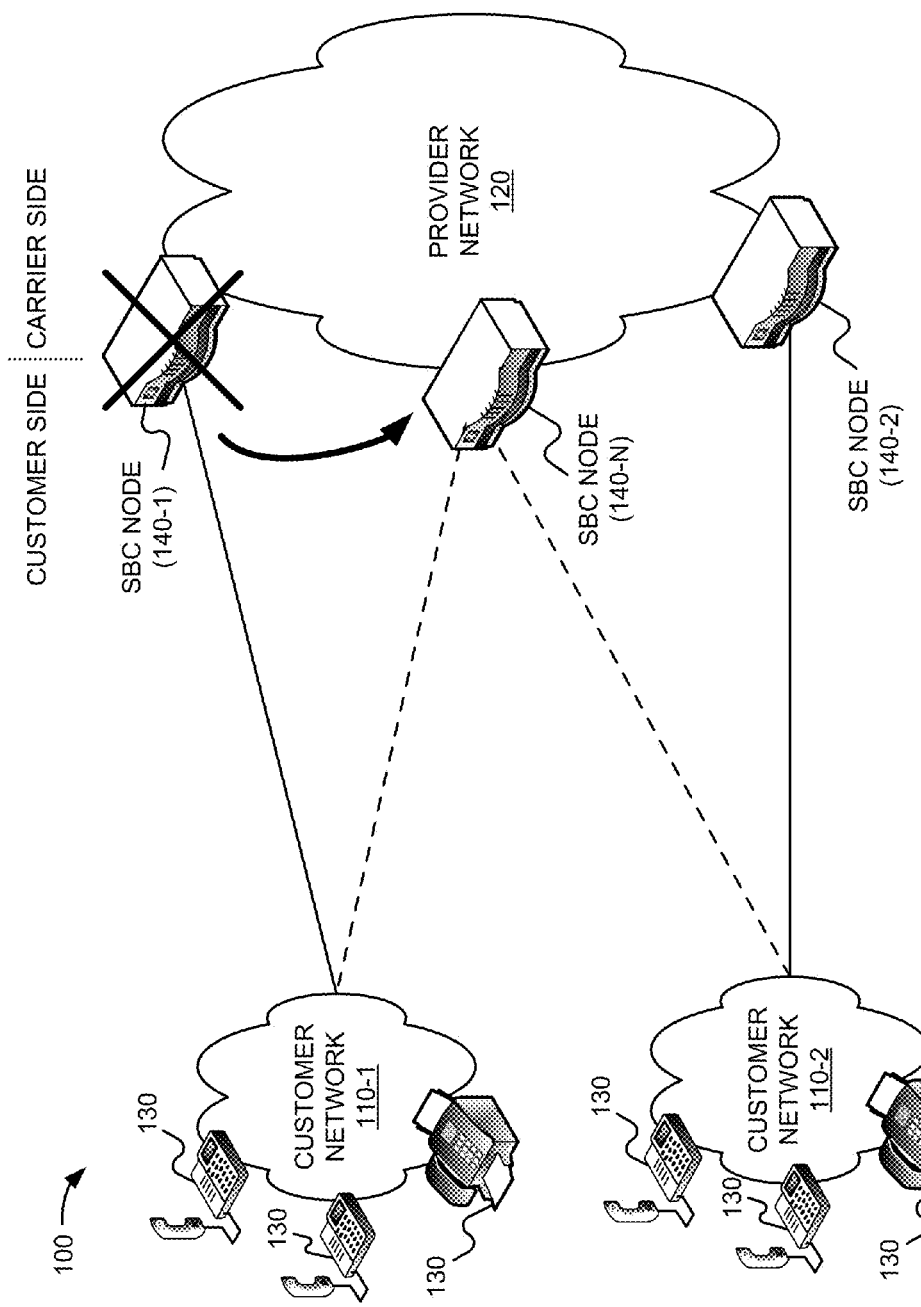
FIG. 1 is a diagram illustrating concepts described herein.

Aspects described herein may provide systems and/or methods that allow a service provider to implement a single redundant failover SBC node for any number (N) of primary SBC nodes in an automated manner. FIG. 1 provides a diagram illustrating concepts described herein. As illustrated, an exemplary environment 100 may include customer networks 110-1 and 110-2 (referred to herein collectively as "customer networks 110") and a provider network 120. Customer networks 110 may each include one or more endpoint devices 130. Each of endpoint devices 130 may include any device or combination of devices that may communicate and/or facilitate VoIP sessions. Calls from each of endpoint devices 130 within customer network 110 may be routed by provider network 120 to their intended recipients. A particular SBC node 140-1 or 140-2 (referred to herein collectively as "SBC nodes 140" and generically as "SBC node 140") may be assigned as the primary SBC to manage signaling and/or media streams for all calls from/to endpoint devices 130 within a particular customer network 110. For example, as shown in FIG. 1, SBC node 140-1 may be assigned as the primary SBC for customer network 110-1 and SBC node 140-2 may be assigned as the primary SBC for customer network 110-2. Each primary SBC (e.g., SBC nodes 140-1 and 140-2) may have a unique customer-side signaling fully-qualified domain name (FQDN) (e.g., a domain name that specifies its exact location in a tree hierarchy of a domain name system (DNS)) and a unique carrier-side signaling FQDN.

It may be desirable for a provider to have a designated failover SBC node 140-N in the event of a failure of either of SBC node 140-1 or SBC node 140-2. In implementations described herein, the provider of provider network 120 may utilize a single failover SBC node 140-N as a cost-effective alternative to providing full failover capability for each of SBC node 140-1 and SBC node 140-2. When an outage occurs, for example, at SBC node 140-1, the outage may be reported and SBC node 140-N may be configured to substitute for SBC node 140-1.

Upon notification of a failure at SBC node 140-1, a configuration file for SBC node 140-1 may be sent (e.g., via secure file transfer protocol) to SBC node 140-N, and a DNS script may be run to change carrier-side IP addresses to that of SBC node 140-N. Carrier-side port numbers would remain the same, and customer side IP addresses and ports may not change. Provider edge routers (not shown) could then advertise the new routes to endpoint devices 130 within customer network 110-1. A DNS server may be script updated to change all affected carrier-side FQDNs to new SBC node 140-N. Customer network 110, service provider network 120, endpoint devices 130, and SBC nodes 140 are discussed further in connection with, for example, FIGS. 2A-5.

Figure 2A:
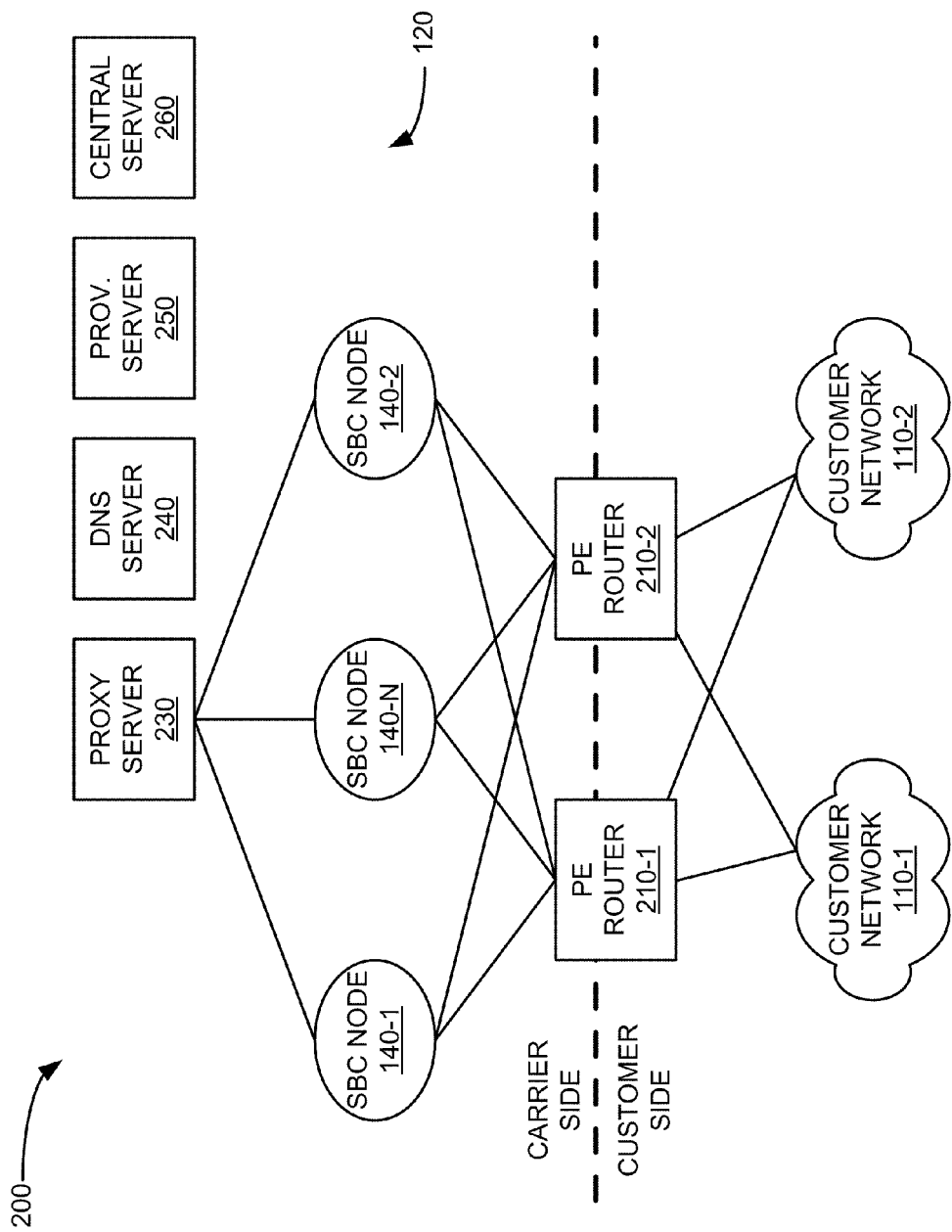
FIGS. 2A and 2B depict an exemplary network in which systems and/or methods described herein may be implemented.

FIG. 2A is a diagram of an exemplary network 200 in which systems and/or methods described herein may be implemented. As illustrated, network 200 may include customer networks 110-1 and 110-2 and provider network 120. Provider network 120 may include provider edge (PE) routers 210-1 and 210-2; SBC nodes 140-1, 140-2, and 140-N; a proxy server 230; a DNS server 240; a provisioning server 250; and a central server 260. Components of network 200 may interconnect via wired and/or wireless connections.

For simplicity, two customer networks 110, one provider network 120, two PE routers 210, three SBC nodes 140, one proxy server 230, one DNS server 240, one provisioning server 250, and one central server 260 have been illustrated in FIG. 2A. In practice, there may be more customer networks 110, provider networks 120, PE routers 210, SBC nodes 140 proxy servers 230, DNS servers 240, provisioning servers 250, and/or central servers 260. Also, in some instances, one or more of the components of network 200 may perform one or more functions described as being performed by another one or more of the components of network 200. Although FIG. 2A illustrates exemplary network 200, in other implementations, network 200 may include differently arranged components than those depicted in FIG. 2A. Additionally, or alternatively, devices may be combined into a single device or may be implemented as two or more devices. Additionally, or alternatively, the connections between devices may be direct or indirect.

Customer network 110 may include a local area network (LAN), a wide area network (WAN), or a combination of networks that provide data, voice, and/or television services to the customer or end user. In one implementation, customer network 110 may include a network interconnecting one or more devices (e.g., endpoint devices 130), such as devices providing data services (e.g., personal computers, workstations, laptops, etc.), devices providing voice services (e.g., telephones), and/or devices providing video services (e.g., televisions, set-top boxes, etc.). In the implementation of FIG. 2A, customer network 110 may be a private IP network, such that both session initiation protocol (SIP) message traffic and DNS services are provided by the current SBC for each customer network (e.g., SBC node 140-1, 140-2). Devices within customer network 110 may use the unique customer-side FQDN for SBC node 140 to conduct SIP sessions. However, devices within customer network 110 may use a static IP address to request DNS services.

Provider network 120 may represent a network used to route customer data traffic to/from various devices in network 200. Provider network 120 may include devices, systems, and/or protocols that provide switching and/or routing of packets. For example, provider network 120 may include Multi-Protocol Label Switching (MPLS) devices, systems, and protocols. Protocols other than MPLS may also be used in provider network 120. Provider network 120 may include one or more sub-networks of any type, including a LAN, a WAN, a satellite network, a metropolitan area network (MAN), a telephone network, such as the public switched telephone network (PSTN) or a Public Land Mobile Network (PLMN), an ad hoc network, an intranet, the Internet, or a combination of networks. The PLMN(s) may further include a packet-switched sub-network, such as, for example, a General Packet Radio Service (GPRS), Cellular Digital Packet Data (CDPD), or Mobile IP sub-network.

PE router 210 may include one or more data transfer devices, such as a gateway, a router, a switch, a firewall, a network interface card (NIC), a hub, a bridge, a proxy server, or some other type of device that processes and/or transfers data. For example, PE router 210 may include routers that provide an entry and/or an exit to and from customer network 110. PE router 210 may convert a packet that enters customer network 110 into a MPLS packet or convert a MPLS packet to a native packet, e.g., a non-MPLS packet. In one implementation, PE router 210 may advertise link states to devices within customer networks 110.

Figure 2B:
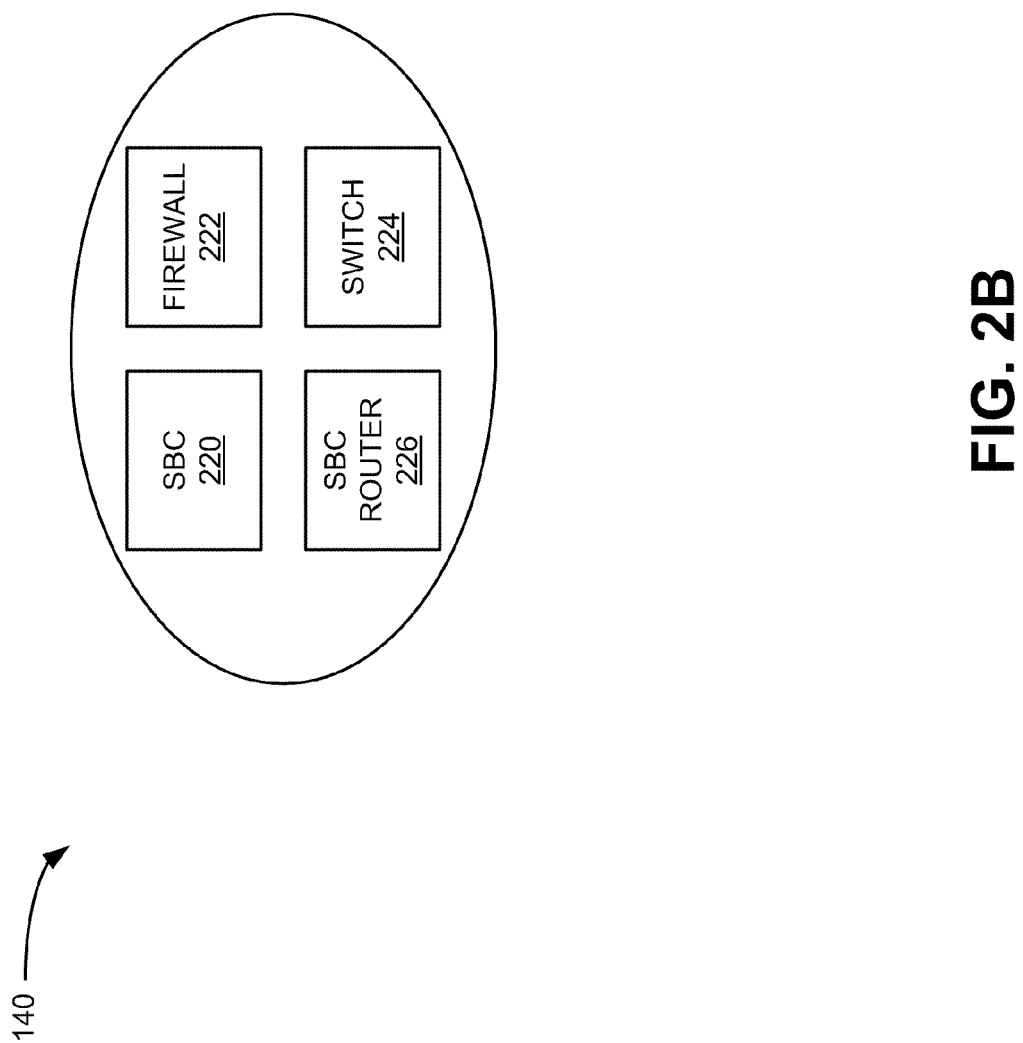

SBC node 140 may include one or more devices for managing signaling and/or media streams. SBC node 140 is described further in connection with FIG. 2B. As shown in FIG. 2B, SBC node 140 may include SBC 220, a firewall 222, a switch 224, and a SBC router 226. In one implementation each of SBC 220, firewall 222, switch 224, and SBC router 226 may be configured in high availability pairs at the same geographic location. Although configured in high availability pair, SBC node 140 may still be susceptible to catastrophic disruptions to that particular geographic location.

SBC 220 may include one or more computation or communication devices that form a border to and from a service provider network (e.g., provider network 120). SBC 220 may be provisioned with a unique FQDN for a customer-side interface (e.g., with customer network 110) and a unique FQDN for a carrier-side interface (e.g., with provider network 120). In one implementation, SBC 220 may receive and respond to SIP messages to manage VoIP and other media services for customer network 110. SBC 220 may also include one or more databases. In one implementation, SBC 220 may refer to a database of information associated with registered endpoints 130 and/or devices (e.g., SIP-enabled endpoints, such as IP telephones, a personal computer with VoIP capability, a gateway, etc.). As described further herein, SBC 220 may communicate with proxy server 230 if SBC 220 does not have information associated with endpoints 130 and/or other devices. SBC 220 may connect to proxy server 230 over, for example, an IP link.

Firewall 222 may include hardware or a combination of hardware and software for permitting or denying a packet from entering SBC node 140. For example, firewall 222 may enforce rules that are related to source/destination addresses, port numbers, protocols, etc., of the packet. Firewall 222 may allow only authorized packets to pass from the public side to the private side.

Switch 224 may include one or more data transfer devices that process and/or transfer data. In one implementation, switch 224 may be an Ethernet switch that accepts IP/MPLS packets and routes them toward their destination devices. For example, switch 224 may concentrate IP/MPLS traffic into a Gigabit Ethernet connection provided in SBC router 226.

SBC router 226 may include one or more data transfer devices that connects via a Gigabit Ethernet connection to PE router 210 and/or proxy server 230. In one implementation, SBC router 226 may provide route lookup, filtering, and sampling, of IP traffic.

Although FIG. 2B illustrates exemplary components of SBC node 140, in other implementations, SBC node 140 may include fewer, different, differently arranged, or additional components than those depicted in FIG. 2B. Additionally, or alternatively, one or more components of SBC node 140 may perform one or more other tasks described as being performed by one or more other components of SBC node 140.

Returning to FIG. 2A, proxy server 230 may include one or more server entities, or other types of computation or communication devices, that function as an intermediary mechanism and act as both a server and a client for the purpose of making SIP requests on behalf of other clients (e.g., endpoint device 130). Proxy server 230 may, for example, interpret, and, if necessary, rewrite a SIP request message before forwarding it. Proxy server 230 may also include security, call routing (e.g., static and dynamic registrations), call-forwarding, privacy, accounting, and/or stateful or stateless transaction capabilities.

DNS server 240 may include one or more server entities, or other types of computation or communication devices, that may perform DNS lookup functions for provider network 120. Through DNS server 240, domain names, such as an FQDN, may be mapped to their official IP addresses (e.g., IPv4 or IPv6 addresses). As used herein, the term "domain name" may be used to refer to a text-based identifier for an IP address. DNS server 240 may perform a DNS lookup so that a request from, for example, an endpoint device 130 can be appropriately routed through provider network 120 toward an intended recipient.

Provisioning server 250 may include one or more server entities, or other types of computation or communication devices, that may provide instructions/information to configure other devices. Provisioning server 250 may accept inputs from a user via a user interface (e.g., a command line interface (CLI), or a graphical user interface (GUI)) and/or via a network. For example, provisioning server 250 may allow a network operator or administrator to manage the configuration components of SBC nodes 140 and or proxy server 230.

Central server 260 may include server entities, or other types of computation or communication devices, that may collect and provide data to devices within provider network 120. In one implementation, central server 260 may store backup configuration files for each of SBCs nodes 140, including, for example, backup configuration files for SBC devices 140 and routers 226. Backup configuration files for SBC nodes 140 may be stored on a periodic basis.

In implementations described herein, a failure of a primary SBC node (e.g., SBC node 140-1 or 140-2) may require a service provider to initiate a migration of customer network 110 from the primary SBC node to a designated failover SBC node (e.g., SBC node 140-N). Provisioning server 250 (or another device or a device in conjunction with a user directly accessing a user interface of the failover SBC) may retrieve configuration information (e.g., a most recent backup configuration file) of the failed primary SBC 220 and modify the configuration information by replacing the carrier-side IP addresses with carrier-side IP addresses for the failover SBC. The configuration file for the failed SBC 220 may be sent (e.g., via a secure file transfer protocol) to failover SBC 220-N, and a DNS script may be executed to change carrier-side IP addresses of the failed SBC node to that of SBC 220-N. Carrier-side port numbers may remain the same, and customer side IP addresses and ports may not change. PE routers 210 may then advertise the new routes to endpoint devices 130 within customer network affected by the failure (e.g., customer network 110-1 or 110-2).

Figure 3:
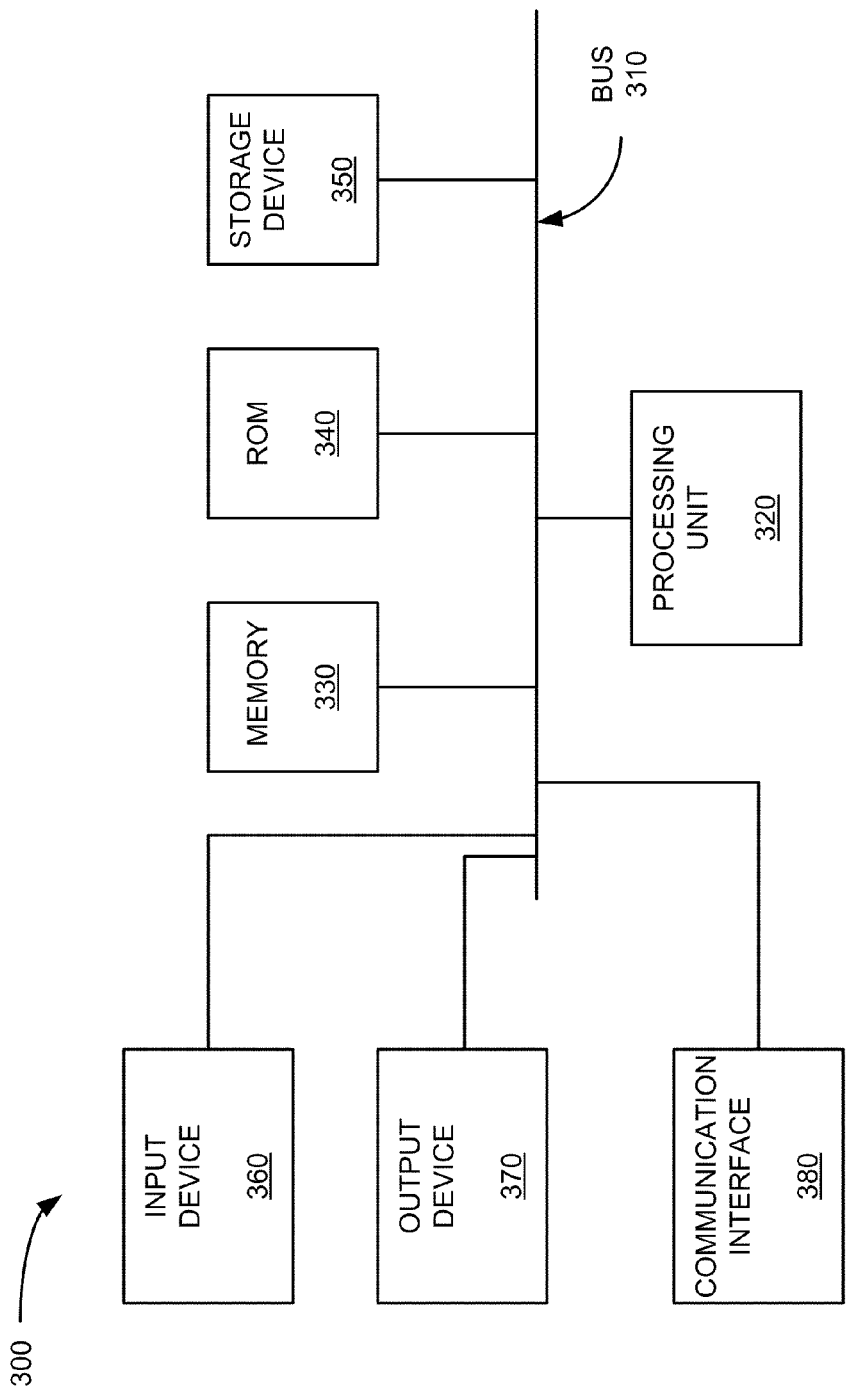
FIG. 3 is a block diagram of exemplary components of a device that may correspond to a session border controller, a proxy server, and/or a provisioning server of FIGS. 2A and 2B.

FIG. 3 is a diagram illustrating exemplary components of a device 300 that may correspond to one or more of the devices depicted in FIGS. 1, 2A, and/or 2B. For example, device 300 may correspond to certain endpoint devices 130, SBC 220, proxy server 230, DNS server 240, provisioning server 250, and/or central server 260. As illustrated, device 300 may include a bus 310, a processing unit 320, a main memory 330, a read-only memory (ROM) 340, a storage device 350, an input device 360, an output device 370, and a communication interface 380.

Bus 310 may include a path that permits communication among the components of device 300. Processing unit 320 may include one or more processors, microprocessors, or other types of processing units, such as application-specific integrated circuits (ASICs), field-programmable gate arrays (FPGAs), etc., that may interpret and execute instructions.

Main memory 330 may include a RAM or another type of dynamic storage device that stores information and instructions for execution by processing unit 320. ROM 340 may include a ROM device or another type of static storage device that may store static information and instructions for use by processing unit 320. Storage device 350 may include a magnetic and/or optical recording medium and its corresponding drive.

Input device 360 may include a mechanism that permits an operator to input information to device 300, such as a keyboard, a mouse, a pen, voice recognition and/or biometric mechanisms, a touch-screen interface, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network, such as customer network 110 and/or provider network 120.

As described herein, device 300 may perform certain operations in response to processing unit 320 executing software instructions contained in a computer-readable medium, such as main memory 330. A computer-readable medium may be defined as a physical or logical memory device. A logical memory device may include memory space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 illustrates exemplary components of device 300, in other implementations, device 300 may include fewer, different, differently arranged, or additional components than those depicted in FIG. 3. Additionally, or alternatively, one or more components of device 300 may perform one or more other tasks described as being performed by one or more other components of device 300.

Figure 4:
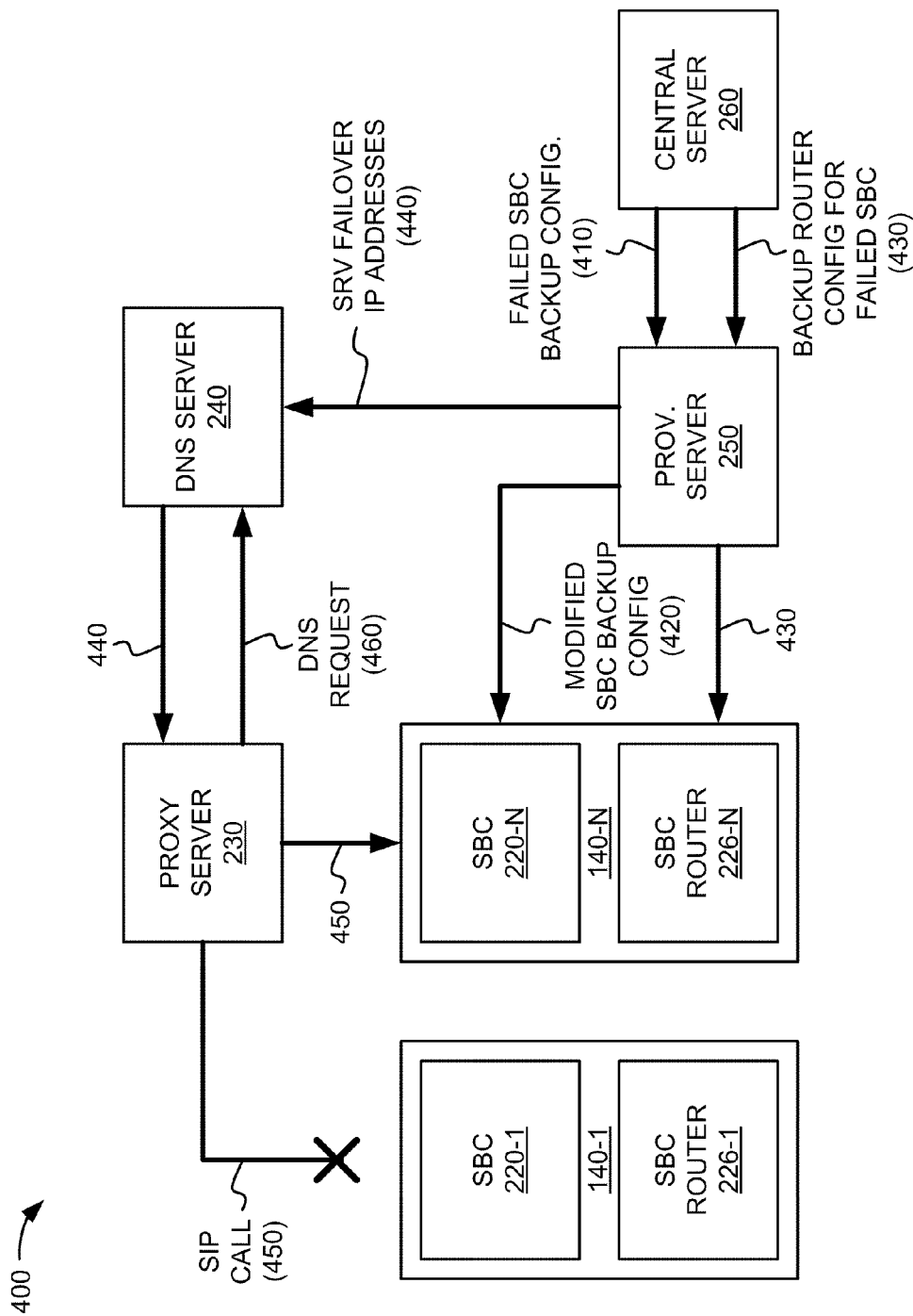
FIG. 4 depicts a diagram of exemplary interactions among components of an exemplary portion of the network illustrated in FIG. 2A.

FIG. 4 depicts a diagram of exemplary interactions among components of an exemplary portion 400 of network 200. As illustrated, exemplary network portion 400 may include SBC nodes 140-1 and 140-N, proxy server 230, DNS server 240, provisioning server 250, and central server 260. SBC nodes 140-1 and 140-N, proxy server 230, DNS server 240, provisioning server 250, and central server 260 may include the features described above in connection with, for example, FIGS. 1-3.

Interactions described in FIG. 4 may occur in response to a failure of a primary SBC node (e.g., SBC node 140-1) so that an available failover SBC node (e.g., SBC node 140-N) may be established. As indicated by reference number 410 of FIG. 4, provisioning server 250 may receive an SBC backup configuration file 410 for the failed SBC node (e.g., SBC node 140-1) from central server 260. In one implementation, provisioning server 250 may request the backup configuration file based on a notification of an SBC failure. Failed SBC backup configuration file 410 may include, for example, a mostly recently available backup SBC prior to the SBC failure. Provisioning sever 250 may modify backup configuration file 410, by replacing the carrier-side IP addresses of the failed SBC node (e.g., SBC node 140-1) with the failover SBC node (SBC node 140-N), to create a modified SBC backup configuration file 420. For example, network interfaces, SIP interfaces, and steering pools may be modified with IP addresses for the failover SBC node. Carrier side port numbers, customer-side IP addresses, and customer-side port numbers may not be changed. In one implementation, modification of backup configuration file 410 may be accomplished as a scripted change (e.g., using Perl scripting or another programming language).

Provisioning server 250 may also receive, from central server 260, a backup router configuration file 430 for a failed router (SBC router 226-1) associated with the failed SBC node (e.g., SBC node 140-1). Provisioning server 250 may send modified SBC backup configuration 420 and backup router configuration file 430 to the failover SBC node (e.g., SBC 220-N and SBC router 226-N). Modified SBC backup configuration file 420 and the backup router configuration file 430 may be provided using a known file transfer mechanism, such as the Secure File Transfer Protocol another file transfer protocol. In another implementation, backup router configuration file 430 may be provided from central server 260 to SBC node 140 (e.g., SBC router 226-N) without passing through provisioning server 250. Modified SBC backup configuration file 420 and the backup router configuration file 430 may be received by SBC node 140-N and used to configure SBC 220-N and SBC router 226-N, respectively, to perform functions previously performed by the failed SBC node (e.g., SBC node 140-1).

The carrier-side IP addresses for the failover SBC node (e.g., SBC node 140-N) may be pre-stored in DNS server 240 as service (SRV) failover IP addresses 440 for all customers of SBC node 140-1 (and any other SBC nodes 140 for which SBC node 140-N serves as a failover SBC). As shown in the implementation of FIG. 4, SRV failover IP addresses 440 may be provided to DNS server 240 by provisioning server 250. In one implementation, DNS server 240 may be script updated to change all affected carrier side FQDNs from the failed SBC node (e.g., SBC node 140-1) to the failover SBC node (e.g., SBC node 140-N). In other implementations, DNS server 240 may receive SRV failover IP addresses 440 from another source. After an SBC node failure occurs, attempts by proxy server 230 to establish a SIP call 450 with the failed SBC node (e.g., SBC node 140-1) will yield no response. As soon as proxy server 230 receives no response from SBC node 140-1, proxy server 230 may send a DNS lookup request 460 to DNS server 240. DNS server 240 may respond to the lookup request with the pre-stored service failover IP addresses 440. Using service failover IP addresses 440, proxy server 230 may then forward SIP call 450 to the failover SBC node (e.g., SBC node 140-N). In one implementation, if one of PE routers 210 or SBC router 226 also fails, a SIP stack may be deactivated on the failed SBC 220 to assure failover of proxy server 230.

Figure 5:
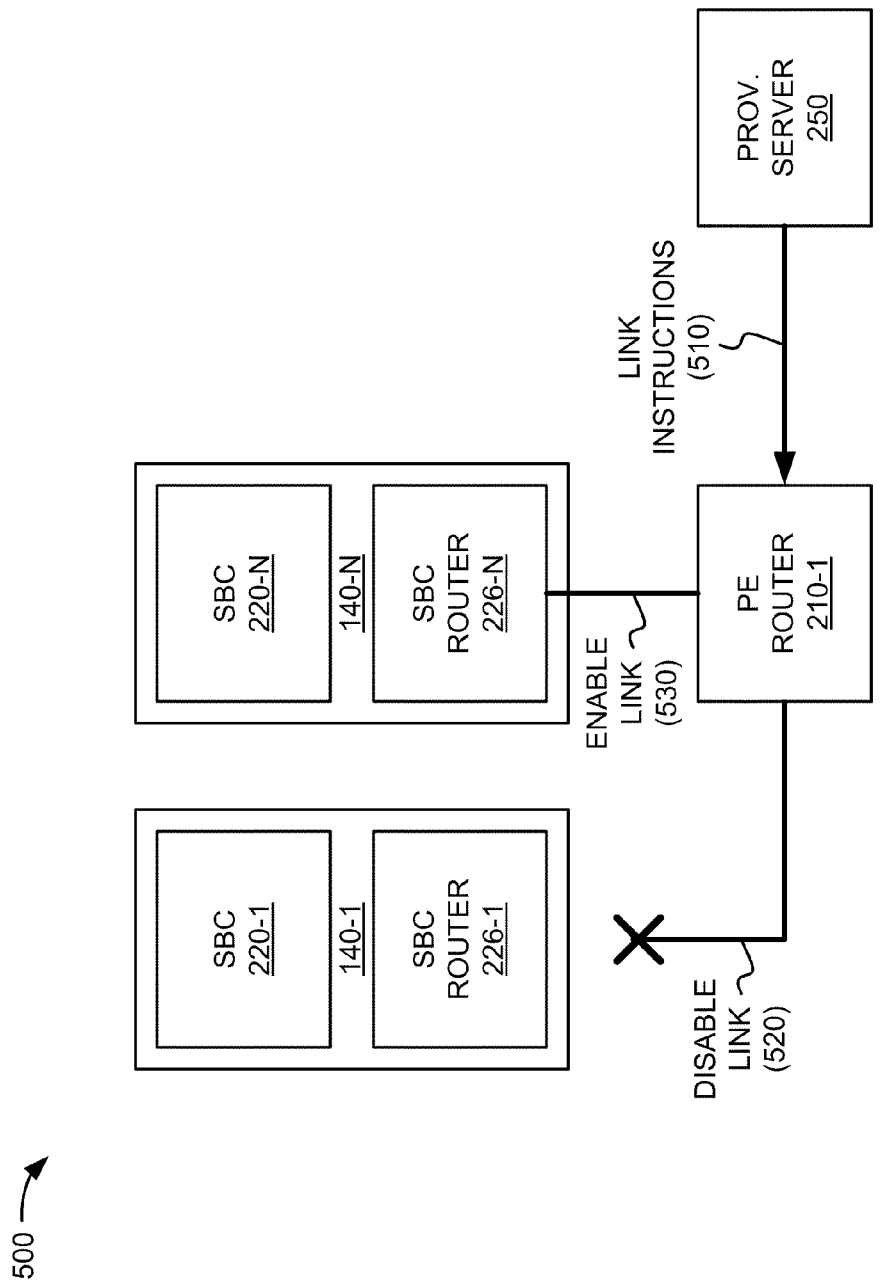
FIG. 5 depicts a diagram of exemplary interactions among components of another exemplary portion of the network illustrated in FIG. 2A.

FIG. 5 depicts a diagram of exemplary interactions among components of another exemplary portion 500 of network 200. As illustrated, exemplary network portion 500 may include PE router 210-1, SBC nodes 140-1 and 140-N, and provisioning server 250. PE router 210-1, SBC nodes 140-1 and 140-N, and provisioning server 250 may include the features described above in connection with, for example, FIGS. 1-4. Interactions described in FIG. 5 may occur in connection with responses, described in FIG. 4, to a failure of a primary SBC node (e.g., SBC node 140-1) to establish an available failover SBC node (e.g., SBC node 140-N).

If PE router 210-1 remains available after the failure of SBC node 140-1 (e.g., a local catastrophe brings down only SBC node 140-1), provisioning server 250 may provide link instructions 510 to PE router 210-1. Link instructions 510 may include a script or other instructions to disable 520 an IP link between PE router 210-1 and the failed SBC node 140-1 (e.g., SBC router 226-1) and to enable 530 an IP link between PE router 210-1 and the failover SBC node 140-N (e.g., SBC router 226-N). As a result, SBC router 226-N may advertise (e.g., using appropriate TCP/IP-based protocols), to PE router 210-1, the new route to SBC node 140-N.

Referring back to FIG. 2A, as a result of the communications described in FIG. 4 and FIG. 5 in response to a failure of SBC node 140-1, SIP calls from proxy server 230 may route through SBC node 140-N, PE router 210-1, to customer network 110-1. Alternatively, if PE router 210-1 fails along with SBC node 140-1, SIP calls from proxy server 230 may route through SBC node 140-N to PE router 210-2 and to customer network 110-1. Similarly, as a result of the communications described in FIG. 4 and FIG. 5 in response to a failure of SBC node 140-1, SIP calls from customer network 110-1 may route through PE router 210-1 to SBC node 140-N and to proxy server 230. Alternatively, if PE router 210-1 fails along with SBC node 140-1, SIP calls from customer network 110-1 may route through PE router 210-2 to SBC node 140-N and to proxy server 230.

Figure 6:
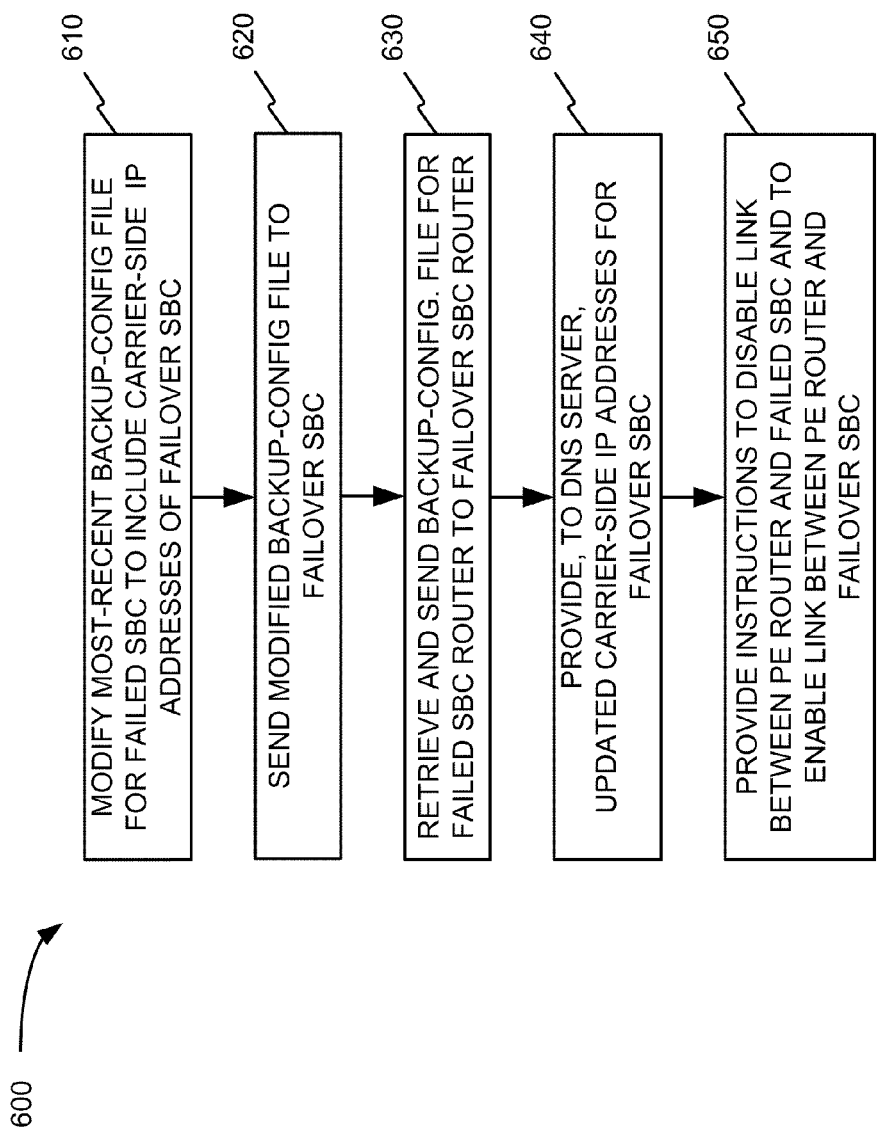
FIG. 6 provides a flow chart of an exemplary process for providing failover, for a private IP customer network, to a new SBC according to implementations described herein.

FIG. 6 provides a flow chart of an exemplary process 600 for providing failover, for a private IP customer network, to a new SBC according to implementations described herein. In one implementation, some or all of process 600 may be performed by one or more devices associated with a provider network (e.g., provider network 120), such as provisioning server 250, central server 260, and/or DNS server 240. In other implementations, some or all of process 600 may be performed by another device or group of devices associated with a provider network.

Process 600 may be performed in response to notification of a failure of a primary SBC. Process 600 may include modifying a most-recent backup configuration file for a failed SBC to include carrier side IP addresses of a failover SBC (block 610) and sending the modified backup configuration file to the failover SBC (block 620). For example, as described above in connection with FIG. 4, as indicated by reference number 410, provisioning server 250 may receive SBC backup configuration file 410 for the failed SBC node (e.g., SBC node 140-1) from central server 260. In one implementation, provisioning server 250 may request backup configuration file 410 based on a notification of an SBC failure. SBC backup configuration file 410 may include, for example, the mostly recently available backup prior to the SBC failure. Provisioning sever 250 may modify backup configuration file 410, by replacing the carrier-side IP addresses of the failed SBC node (e.g., SBC node 140-1) with the failover SBC node (SBC node 140-N), to create modified SBC backup configuration file 420. For example, network interfaces, SIP interfaces, and steering pools may be modified with IP addresses for the new SBC node. Carrier side port numbers, customer-side IP addresses, and customer-side port numbers may not be changed. In one implementation, modification of backup configuration file 410 may be accomplished as a scripted change (e.g., using Perl scripting or another programming language). Provisioning server 250 may send modified SBC backup configuration 420 to the failover SBC node (e.g., SBC node 140-N).

Returning to FIG. 6, a backup configuration file for a failed SBC router may be retrieved and sent to a failover SBC router (block 630). For example, as described above in connection with FIG. 4, provisioning server 250 may receive, from central server 260, backup configuration file 430 for the router (SBC router 226-1) associated with the failed SBC node (e.g., SBC node 140-1). Provisioning server 250 may send backup router configuration file 430 to the failover SBC node (e.g., SBC router 226-N). In another implementation, backup router configuration file 430 may be provided from central server 260 to SBC router 226-N without passing through provisioning server 250.

Returning again to FIG. 6, updated carrier-side IP addresses for the failover SBC may be provided to a DNS server (block 640). For example, as described above in connection with FIG. 4, the carrier-side IP addresses for the failover SBC node (e.g., SBC node 140-N) may be pre-stored in DNS server 240 as service (SRV) failover IP addresses 440 for all customers of SBC node 140-1 (and any other SBC nodes 140 for which SBC node 140-N serves as a failover SBC). As shown in the implementation of FIG. 4, SRV failover IP address 440 may be provided to DNS server 240 by provisioning server 250. In other implementations, DNS server 240 may receive SRV failover IP address 440 from another source. After an SBC node failure occurs, attempts by proxy server 230 to establish SIP call 450 with the failed SBC node (e.g., SBC node 140-1) will yield no response. As soon as proxy server 230 receives no response from SBC node 140-1, proxy server 230 may send DNS lookup request 460 to DNS server 240. DNS server 240 may respond with the pre-stored service failover IP addresses 440. Using service failover IP addresses 440, proxy server 230 may then forward SIP call 450 to the failover SBC node (e.g., SBC node 140-N).

Instructions to disable a link between a PE router and the failed SBC node and to enable a link between the PE router and the failover SBC node may be provided (block 650). For example, as described above in connection with FIG. 5, if PE router 210-1 remains available after the failure of SBC node 140-N, provisioning server 250 may provide link instructions 510 to PE router 210-1. Link instructions 510 may include a script or other instructions to disable 520 an IP link between PE router 210-1 and the failed SBC node 140-1 (e.g., SBC router 226-1) and to enable 530 an IP link between PE router 210-1 and the failover SBC node 140-N (e.g., SBC router 226-N). As a result, SBC router 226-N may advertise (e.g., using appropriate TCP/IP-based protocols), to PE router 210-1, the new route to SBC node 140-N.

Implementations described herein may provide systems and/or methods that receive a notification that a SBC device has failed and, in response to the notification, modify a backup configuration file for the failed SBC device to create a modified backup configuration file, where the modified backup configuration file replaces carrier-side IP addresses of the failed SBC device with carrier-side addresses of a failover SBC device. The systems and/or methods may also send the modified backup configuration file to the failover SBC device to configure the failover SBC device and may send a backup configuration file for a local router associated with the failed SBC device to a local router associated with the failover SBC device. The systems and/or methods may further provide, to a DNS server, carrier-side IP addresses for the failover SBC device to replace IP addresses associated with FQDNs of the failed SBC device.

The foregoing description provides illustration and description, but is not intended to be exhaustive or to limit the implementations to the precise form disclosed. Modifications and variations are possible in light of the above teachings or may be acquired from practice of systems and/or methods disclosed herein.

For example, while a series of blocks has been described with regard to the flowcharts of FIG. 6, the order of the blocks may differ in other implementations. Further, non-dependent blocks may be performed in parallel.

Also, although the Session Initiation Protocol (SIP) may be mentioned in reference to an implementation associated with the concepts described herein, other IP signaling protocols may be employed (e.g., H.323, Media Gateway Control Protocol (MGCP), and/or Megaco/H.248). Accordingly, the concepts described herein are not dependent on employing a particular protocol.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
   determining, by one or more devices, a failure of a first session border controller (SBC);
   identifying, by the one or more devices, a second SBC that is designated as a failover SBC for the first SBC and one or more other SBCs;
   modifying, by the one or more devices and after determining the failure of the first SBC, backup configuration information for the first SBC to create modified backup configuration information,
      the modifying including replacing carrier-side Internet Protocol (IP) addresses of the first SBC, within the backup configuration information, with carrier-side addresses of the second SBC;
   sending, by the one or more devices, the modified backup configuration information to the second SBC,
      the modified backup configuration information being to configure the second SBC;
   sending, by the one or more devices, a backup configuration file, for a first local device associated with the first SBC, to a second local device associated with the second SBC,
      the backup configuration file being to configure the second local device associated with the second SBC; and
   providing, by the one or more devices and to a domain name system (DNS) server, the carrier-side addresses of the second SBC to replace IP addresses associated with fully-qualified domain names (FQDNs) of the first SBC.

2. The method of claim 1,
   where determining the failure of the first SBC includes:
      receiving a notification of the failure of the first SBC, and
   where the method further comprises:
      retrieving, from a central server and based on the notification, the backup configuration information for the first SBC; and
      retrieving, from the central server and based on the notification, the backup configuration file for the first local device associated with the first SBC.

3. The method of claim 1, further comprising:
   providing, to a provider edge (PE) device, instructions to disable a first link between the PE device and the first local device associated with the first SBC; and
   providing, to the PE device, instructions to enable a second link between the PE device and the second local device associated with the second SBC.

4. The method of claim 1, further comprising:
   sending a session initiation protocol (SIP) session signal to an IP address associated with the first SBC;
   determining that no response to the SIP session signal is received from the first SBC; and
   sending the SIP session signal to an IP address associated with the second SBC.

5. The method of claim 4, further comprising:
   receiving the IP address associated with the second SBC from the DNS server.

6. The method of claim 1, where the backup configuration information for the first SBC includes a backup configuration file, for the first SBC, selected from a plurality of backup configuration files.

7. The method of claim 1, further comprising:
   receiving a session initiation protocol (SIP) session signal from a proxy server,
      the SIP session signal being based on DNS entry updates for one or more fully-qualified domain names (FQDNs) associated with the first SBC.

8. The method of claim 1, where sending the modified backup configuration information to the second SBC includes:
   sending the modified backup configuration information by using a secure file transfer protocol.

9. A device comprising:
   one or more processors to:

receive a notification,
determine a failure of a first session border controller (SBC) device based on the notification,
identify a second SBC device that is designated as a failover SBC for the first SBC device and one or more other SBC devices,
modify, after determining the failure of the first SBC device, a backup SBC configuration file for the first SBC device, to create a modified backup configuration file, by replacing carrier-side Internet Protocol (IP) addresses of the first SBC device, within the backup SBC configuration file, with carrier-side IP addresses of the second SBC device,
send the modified backup configuration file to the second SBC device to configure the second SBC device,
send a backup device configuration file, for a first local device associated with the first SBC device, to a second local device associated with the second SBC device,
   the backup device configuration file being to configure the second local device associated with the second SBC device, and
provide, to a domain name system (DNS) server, the carrier-side IP addresses of the second SBC device to replace IP addresses associated with fully-qualified domain names (FQDNs) of the first SBC device.

10. The device of claim 9, where the modified backup configuration file includes IP addresses of the second SBC device for carrier-side network interfaces, session initiation protocol (SIP) interfaces, and steering pools.

11. The device of claim 9, where the modified backup configuration file includes carrier-side port numbers, customer-side IP addresses, and customer-side port numbers that are identical to carrier-side port numbers, customer-side IP addresses, and customer-side port numbers of the backup SBC configuration file for the first SBC device.

12. The device of claim 9, where, when modifying the backup SBC configuration file, the one or more processors are to:
   modify the backup SBC configuration file for the first SBC device by applying a script.

13. A system comprising:
one or more processors to:
   receive a notification regarding a failure of a particular primary session border controller (SBC) node of a plurality of primary SBC nodes,
   identify a failover SBC node that is designated for the plurality of primary SBC nodes,
   generate, based on the notification, a modified backup configuration file by replacing addresses associated with the particular primary SBC node with carrier-side addresses associated with the failover SBC node within a file used to create the modified backup configuration file, and
   configure the failover SBC node based on the modified backup configuration file,
      the failover SBC node receiving a session initiation protocol (SIP) session signal from a proxy server,
      the SIP session signal being based on domain name system (DNS) entry updates for one or more fully-qualified domain names (FQDNs) associated with the particular primary SBC node.

14. The system of claim 13, where, when configuring the failover SBC node, the one or more processors are to:
   transmit the modified backup configuration file to a failover SBC device of the failover SBC node.

15. The system of claim 13, where the one or more processors are further to:
   provide, to a provider edge (PE) device, instructions to disable a first link between the PE device and a first local device associated with the particular primary SBC node, and
   provide, to the PE device, instructions to enable a second link between the PE device and a second local device associated with the failover SBC node.

16. The system of claim 15, where the one or more processors are further to:
   retreive the the file used to create the modified backup configuration file from a central server that stores backup configuration files for each of the plurality of primary SBC nodes.

17. A non-transitory computer-readable medium comprising:
one or more instructions that, when executed by at least one processor, cause the at least one processor to:
   receive a notification,
   identify, based on the notification, a failed session border controller (SBC) of a plurality of SBCs;
   identify a failover SBC that is designated for the plurality of SBCs;
   retrieve, after identifying the failed SBC, backup configuration information for the failed SBC;
   modify the backup configuration information for the failed SBC, to create modified backup configuration information, by replacing carrier-side Internet Protocol (IP) addresses of the failed SBC, within the backup configuration information, with carrier-side addresses of the failover SBC;
   send the modified backup configuration information to the failover SBC to configure the failover SBC;
   retrieve a backup configuration file for a first local device associated with the failed SBC;
   send the backup configuration file to a second local device associated with the failover SBC; and
   provide, to a domain name system (DNS) server, the carrier-side IP addresses of the failover SBC to replace IP addresses associated with one or more fully-qualified domain names (FQDNs) of the failed SBC.

18. The non-transitory computer-readable medium of claim 17, further comprising:
one or more instructions that, when executed by the at least one processor, cause the at least one processor to:
   provide, to a proxy server within a provider network, DNS entry updates for the one or more FQDNs.

19. The non-transitory computer-readable medium of claim 17, where the modified backup configuration information includes IP addresses of the failover SBC device for carrier-side network interfaces, session initiation protocol (SIP) interfaces, and steering pools.

20. The non-transitory computer-readable medium of claim 17, where the modified backup configuration information includes carrier-side port numbers, customer-side IP addresses, and customer-side port numbers that are identical to carrier-side port numbers, customer-side IP addresses, and customer-side port numbers of the backup configuration information for the failed SBC.

* * * * *